Patented Dec. 5, 1933

1,937,632

UNITED STATES PATENT OFFICE 1,937,632

PROCESS OF TREATING ZINC ORES

Niels C. Christensen, Salt Lake City, Utah

Application September 25, 1931
Serial No. 565,153

21 Claims. (Cl. 23—125)

This invention relates to the treatment of zinc ores. It relates primarily to the hydrometallurgical treatment of raw zinc sulphide ores so as to recover the zinc and sulphur therefrom without roasting. In the treatment of the suphide ores in the process a smaller proportion of oxidized ore is also treated for the recovery of zinc therefrom. The invention relates to the treatment of the sulphide ores with sulphuric acid by the methods similar to those described in my copending patent applications 523,575 and 523,576, both filed March 18, 1931, which describe the applications of the process to the recovery of the zinc in metallic form by electrolysis. It is the object of this invention to recover the zinc as other products and by slightly different methods than those described in said applications.

As described in above mentioned pending patent applications, the first and essential step of the process consists in treating the ore with hot relatively concentrated sulphuric acid in such manner as to decompose the ZnS and form solid zinc sulphate and $H_2S$. As noted in above said applications and as more fully described in my U. S. Patent 1,434,084, hot sulphuric acid of a concentration of approximately 60% or higher will attack ZnS forming $ZnSO_4$ and drive off the sulphur as $H_2S$. If sufficient $H_2SO_4$ is used, the $ZnSO_4$ dissolves in the excess acid and a complete extraction of the zinc may be secured. However, as noted in above said patent and applications, a relatively very large volume of acid must be used to secure complete solution of the zinc by this method due to the limited solubility of $ZnSO_4$ in the acid. If only a relatively small excess of acid is used, the reaction between the acid and the ZnS stops as the saturation point of the acid in the $ZnSO_4$ is approached, due to the formation of an insoluble superficial coating of $ZnSO_4$ upon the ZnS particles which protects the sulphide against further action by the acid. Also the stopping of the sulphating reaction (when only a small excess of acid is employed) is in part also due to the fact that the acid becomes more dilute, since it is actual $H_2SO_4$ which reacts on the ZnS, while the diluent (water) remains. The reaction will go on much slower when the concentration of the acid goes below 60% and will practically stop before the said acid gets down to 50% concentration. Hence it is herein proposed to add a concentrated $H_2SO_4$ (of say 93%) to the mass undergoing reaction in the grinder, as the sulphation reaction goes on, to keep the acid concentration up to not considerably below 60% concentration, whereby the reaction is allowed to go on at a rapid rate. By this mode of operation, the total excess of acid is kept at a minimum, while still allowing complete sulphation of the ore.

Since the circulating acid (i. e. that separated from the treated ore, in the filter) is already saturated with $ZnSO_4$, and since the added strong $H_2SO_4$ is in relatively small amount, only a very small amount of the $ZnSO_4$ formed can be dissolved during the sulphation treatment, and nearly all of the $ZnSO_4$ formed in the process remains with the ore residue (gangue etc.) in the solid condition. As noted in the copending patent applications mentioned above, I have found that this superficial coating may easily be removed by a gentle grinding or attrition, and thus I can allow the reaction between the hot acid and the ZnS particles to proceed rapidly until the ZnS is all converted into solid zinc sulphate. I have found it readily possible (by this method) to convert as much as 98% and even more, of the zinc content of the ore, into zinc sulphate. By thus grinding the zinc sulphide ore with the hot acid a complete conversion of the ZnS to solid $ZnSO_4$ occurs in about 10 to 30 minutes. This method makes it possible to sulphate all the zinc in the ore and drive off the sulphur as $H_2S$ by the use of a relatively very small proportion of hot acid, as compared with that required in the process of Patent #1,434,084. The very large volume of acid required in the latter process is a serious handicap in commercial operation, whereas with the process of this invention the volume of acid required is so small as to offer no difficulties in practical application.

In the process of my earlier Patent 1,434,084, it is necessary to cool the hot excess acid to precipitate the zinc sulphate therefrom and to separate the zinc sulphate from the cold acid and to then reheat the cold excess acid for reuse in the process. The separation of this large volume of acid from the ore residue and the separation of the said acid from the precipitated zinc sulphate, and the cooling and heating and handling of this large volume of acid, all present serious difficulties in the commercial application of the process, due to cost of operation and relatively large size of the apparatus required. By direct conversion of the zinc sulphide to solid zinc sulphate, as noted above, the amount of excess acid may be reduced to a minimum, the cooling and reheating of the excess acid may be avoided, and the size of apparatus required is also greatly decreased. The very great importance of these factors in the commercial application of the process will be apparent.

Following the sulphating operation the excess of hot acid is separated from the ore residue and solid zinc sulphate by filtration. The filter cake containing the ore residue, zinc sulphate and some residual acid is then mixed with sufficient hot water to form a hot concentrated acid zinc sulphate solution. The acid in this solution is neutralized with oxidized zinc ore and any iron and manganese precipitated from solution during this treatment by addition of suitable oxidizing agent. This neutralizing and purifying step may be carried out either by separating the hot acid zinc sulphate solution from the insoluble ore residue by filtration and washing and thereafter treating the solution with the oxidized ore and oxidizing agent, or by mixing the oxidized ore and oxidizing agent with the mixture of ore residue and acid zinc sulphate solution. The second method saves one complete mixing, filtering and washing operation and is therefore preferred unless it is desired to keep the leached ore residues separate. The hot concentrated zinc sulphate solution thus formed is separated from the leached ore residue and treated with zinc dust to precipitate Cd, Cu, Ag, Pb, from the solution. The pure hot concentrated zinc sulphate solution thus secured is utilized for making zinc sulphide, basic zinc carbonate, zinc oxide, or metallic zinc as briefly described in the following: For the direct manufacture of ZnS the zinc is precipitated from this solution as pure ZnS by treatment with $Na_2S$ or $Na(SH)$ made from the $H_2S$ generated in the sulphating treatment, or to make a calcium base lithopone (mixture of ZnS and $CaSO_4$) by precipitation with $Ca(SH)_2$ solution made from the $H_2S$ generated in the sulphating treatment. The zinc sulphide product thus made is filtered, washed, dried, calcined at 500° C., quenched, and ground to form a white zinc sulphide pigment. To make the basic zinc carbonate, the hot concentrated zinc sulphate solution is mixed with $CaCl_2$ solution to form a zinc chloride solution and precipitate $CaSO_4$ as indicated in the following chemical equation:

$$ZnSO_4 + CaCl_2 = CaSO_4 + ZnCl_2$$

The hot zinc chloride solution thus formed is separated from the $CaSO_4$ precipitate by filtration and washing and the zinc is precipitated therefrom as a basic zinc carbonate by boiling the solution with finely divided $CaCO_3$ as indicated by the following chemical equation:

$$5ZnCl_2 + 5CaCO_3 + 3H_2O =$$
$$2ZnCO_3.3Zn(OH)_2 + 5CaCl_2 + 3CO_2$$

This precipitate is ground and washed for the removal of Ca and Cl and may be dried and marketed as such or may be treated to make zinc sulphide or zinc oxide or for the recovery of metallic zinc. To make zinc sulphide this basic carbonate is subjected to a suphidizing operation preferably in suspension in water, the $H_2S$ converting the zinc to the sulphide as indicated below:

$$2ZnCO_3.3Zn(OH)_2 + 5H_2S = 5ZnS + 8H_2O + 2CO_2$$

This ZnS is filtered, washed, dried, calcined, and quenched and ground to make a white zinc sulphide pigment. The basic zinc carbonate may also be calcined to convert it to zinc oxide. The zinc oxide thus formed may be used as a pigment, or may be reduced with carbon or natural gas in a retort to secure metallic zinc, may be treated upon a Wetheril grate to make sublimed zinc oxide, or may be treated with $H_2S$ from the sulphating operation to make ZnS the zinc oxide being suspended in water like the basic carbonate in the previous example, the process proceeding according to the following chemical equation:

$$ZnO + H_2S = ZnS + H_2O$$

The ZnS thus formed being filtered, dried, calcined, quenched, and ground to form the white ZnS pigment. This mode of forming zinc sulphide pigment is claimed in a copending application Ser. No. 564,695 filed Sept. 23, 1931.

The zinc may also be recovered from the basic zinc carbonate or the zinc oxide by utilizing either of them to neutralize the acid formed in an electrolytic zinc circuit and thus recover the zinc therefrom by electrolysis.

The methods of carrying out the invention, as briefly outlined above, in its different applications, is illustrated in the accompanying flow sheets forming Fig. 2 of the drawings. The accompanying curves shown in Fig. 1, also illustrate the limiting conditions for efficient operation at important points in the process.

Figure I consists of two curves A and B showing the solubility of zinc sulphate respectively in hot and in cold acids of different concentrations.

Figure II shows a flow sheet of the process indicating the important steps and apparatus in the process.

As noted above, an essential and most important step in the whole process of this case, consists grinding in the finely divided ore with an excess of hot sulphuric acid of a concentration preferably between 60% and 65% until the zinc is converted to $ZnSO_4$, the sulphur being driven off as $H_2S$. This operation is preferably carried out in an acid-proof silex or porcelain lined pebble mill, called sulphator (1), containing small flint pebbles or porcelain marbles as the grinding medium. The mill should preferably be jacketed and insulated to maintain the temperature and prevent loss of heat. Though there is some reaction between the acid and zinc sulphide at lower temperatures the reaction proceeds most rapidly at temperatures near the boiling point of the acid and it is preferable to keep the acid as near this temperature as possible during the grinding. From 10 to 30 minutes grinding is sufficient to sulphate substantially all the zinc in ores that are amenable to treatment by the process. In order to save the $H_2S$ and keep it free from contamination with air, the ore and hot acid are fed into the mill at the feed end through a gas tight gland and the mixture of excess acid and sulphated ore and the $H_2S$ gas are discharged through a gas tight gland into a discharge box at the discharge end, from which the sulphated pulp and excess acid flows, preferably through a shallow inverted siphon, to the filter (2) and from which the $H_2S$ gas is discharged through pipes to the $Ca(SH)_2$ plant (3). The ratio of hot circulating acid (60% to 65% $H_2SO_4$) to ore, may vary from just enough acid to make a fluid pulp suitable for grinding to 2 or 3 parts (by weight) of acid to ore, or more if desired, though there is no advantage in using the larger volumes of acid. The amount of acid consumed in sulphating the zinc (and Pb, etc., if lead is present) is added with the ore preferably as hot 98% $H_2SO_4$. If the larger volumes of circulating acid are used this acid may be mixed with the incoming circulating acid, but if the smaller volume of circulating acid is used, the amount of 98% acid to be consumed in sulphating is preferably added progressively during the sulphating operation in order to avoid the use of acid of sufficient concentration to react with the $H_2S$ and increasing the acid consumption.

The consumed acid includes that used in sulphating the ZnS, etc., in the sulphide ore and also the acid neutralized by the oxidized ore.

Figure 1:
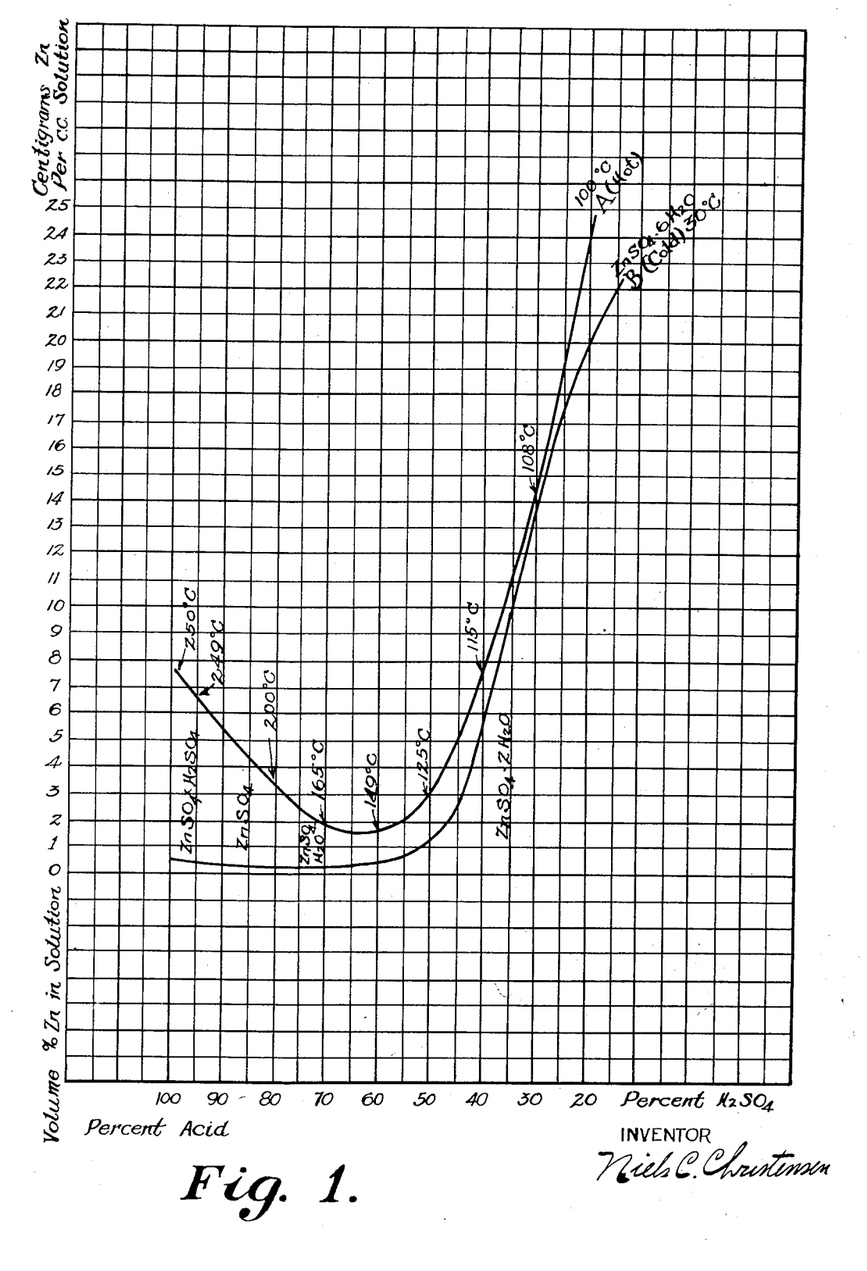
Figure 2:
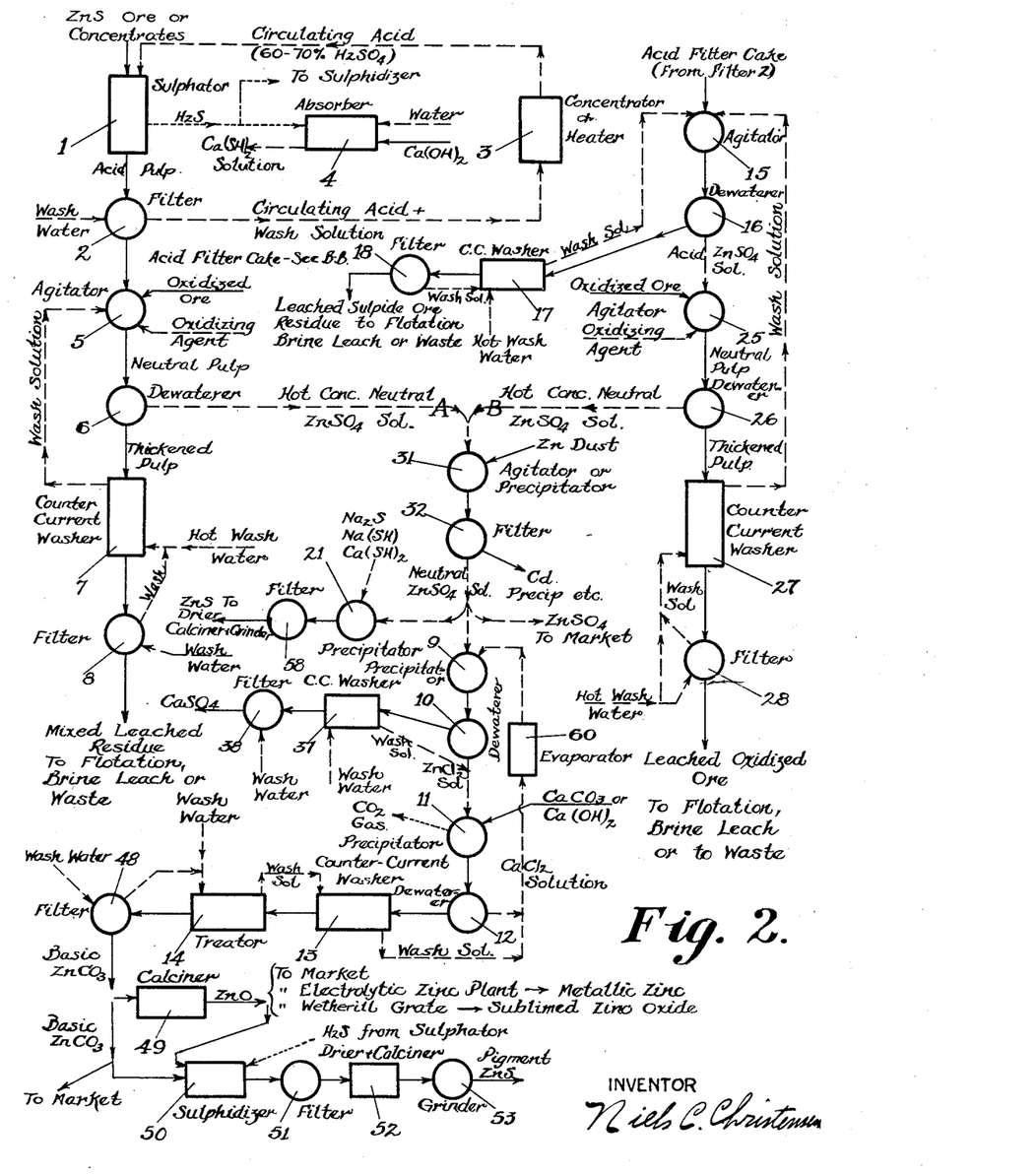

The mixture of sulphated ore and excess acid from the sulphator (1) passes to the filter (2) as much as possible of the acid is removed by filtration and if it is desired to cut down the amount of oxidized ore used in the process the filter cake is given a "flash" wash with water to remove as much more of the acid as possible without dissolving any considerable amount of the $ZnSO_4$ in the cake. As will be noted by reference to the curves in Fig. I, a small wash which will only slightly dilute the acid in the cake will not remove much $ZnSO_4$ as the dilution of the acid from 65% to 50% does not greatly increase the solubility of the $ZnSO_4$. The excess circulating acid and washings from the acid-proof filter (2) are passed through the heater and concentrator (3) where the wash water is evaporated and the acid is heated for reuse and returned to the sulphator as shown. The $H_2S$ goes to the absorber (4) where it is absorbed in an emulsion of $Ca(OH)_2$ in water to form a $Ca(SH)_2$ solution or may go to an acid plant or sulphur recovery plant. The filter (2) must be acid proof and must be supplied with an acid proof filter medium such as filtros, alundum, or acid proof metal filter cloth. The sulphated pulp filters very readily and a rotating annular vacuum filter of the sand filter type may be used for this purpose, or a pressure filter such as the Burt may be used.

If the excess of acid used in the sulphating operation is kept as low as possible, it may not be necessary or possible to remove any excess of hot acid by filtration and this second step of the process may thus be avoided and the sulphated ore be sent directly to the washing or neutralizing operation, as described below. For practically complete recovery of the zinc, however, I have found that with most ores it is preferable or necessary to use such an excess of acid in the sulphating operation that the greater part of this excess must be separated from the ore before neutralizing in order to avoid the use of too large a proportion of oxidized ore.

The concentrator and heater (3) may be of any standard type of apparatus but the preferred type consists of a horizontal rotating cylinder (acid proof) enclosed with a suitable housing and slightly dipping into the acid which is thus thrown from the drum as a spray through which hot combustion gases are passed to evaporate the water and heat the acid. The $H_2S$ absorber (4) consists preferably of a similar device, though any other suitable standard apparatus may be used.

The zinc sulphate in the filter-cake from the filter (2) may be recovered either of two ways as indicated respectively as A—A and B—B in the flow sheet. In the first method, A to A, the acid filter cake is mixed with sufficient hot water in the agitator (5) to dissolve the zinc sulphate and acid to form a hot acid concentrated zinc sulphate solution. To this mixture enough oxidized zinc ore (or zinc-lead ore) is added to neutralize the acid and dissolve the zinc out of the oxidized ore, and enough of an oxidizing agent such as lead peroxide, zinc peroxide, or chloride of lime or other suitable oxidizer to precipitate the iron and manganese out of the zinc solution. This neutralizing and cleaning operation is carried out at a temperature between 60° and 80° C. (or higher) so as to secure a zinc sulphate solution of high concentration. The hot neutral zinc sulphate solution thus formed is washed out of the mixed leached residue of sulphide and oxidized ore by filtration and washing. This operation preferably carried out by means of a dewaterer or filter (5) followed by a washing operation in a counter-current washer (7) and final filter (8), as shown in the flow sheet, the wash solutions from the counter-current washer (7) and filter (8) being added to the agitator (5) to dissolve the zinc sulphate out of the sulphated ore from the sulphator (1).

In the second method, B to B, the acid filter cake from the filter (2) is mixed with sufficient hot water in the agitator (15) to dissolve the zinc sulphate and form a hot acid concentrated zinc sulphate solution. This acid solution is separated from the residue of leached lixiviated sulphide ore in the dewaterer (16) and the residual zinc sulphate solution is separated from the residue of ore in the counter-current washer (17) and filter (18), the wash solutions from (17) and (18) being added to the agitator (15) to dissolve the $ZnSO_4$ as shown in the flow sheet. The hot acid zinc sulphate solution is mixed with sufficient oxidized zinc (or zinc-lead) ore to neutralize the acid and dissolve the zinc in the oxidized ore, in the agitator (25) enough oxidizing agent being added near the end of this treatment to insure complete precipitation of any iron and manganese in the solution. The hot concentrated zinc sulphate solution thus formed is separated from the leached residue of oxidized ore in the dewaterer (26) and the residue of ore is separated from the residual solution in the counter-current washer (27) and filter (28), the wash solutions being returned to the agitator (15) for dissolving $ZnSO_4$ from the sulphated sulphide ore.

The mixed residue of sulphide and oxidized ore from A—A and the separate ore residues from B—B may be treated by the brine leaching process to recover any lead (or lead and silver) therein and the residue may be treated by flotation to recover the pyrite therefrom, or the residues may be discharged to waste if they contain no recoverable values. Any silver in solution may be precipitated from the $ZnSO_4$ solution by the addition of sufficient $ZnCl_2$ after neutralizing, or may be recovered from the $ZnSO_4$ solution by means of metallic zinc as mentioned below.

The hot concentrated neutral zinc sulphate solution obtained from A—A or B—B is treated with zinc dust in the agitator (31) to precipitate any Cu, Cd, Ag, or Pb, etc., in the solution and the precipitated metals and excess Zn dust are filtered out of the solution in the filter (32).

The pure hot concentrated zinc sulphate solution obtained by the foregoing processes may be treated in a variety of ways to prepare it for market or to make marketable zinc products therefrom as described in the following:

The zinc sulphate solution may be marketed as such or may be evaporated to secure hydrous or anhydrous $ZnSO_4$ for market. The solution may also be used to make lithopone by the standard methods. It may also be used to make pigment zinc sulphide or calcium base lightpone as described in the following: The $Ca(SH)_2$ made in the absorber (4) may be used to precipitate the ZnSO₄ solution and form a mixed precipitate of CaSO₄ and ZnS as indicated by the following chemical equation:

$$ZnSO_4 + Ca(SH)_2 = ZnS + CaSO_4 + H_2S$$

A small excess of Ca(SH)₂ is preferably used in this precipitation. The mixed precipitate preferably containing some excess Ca(SH)₂ is filtered out of the solution and dried, calcined, quenched and ground, washed and dried to make a calcium base lithopone consisting of anhydrous CaSO₄ and ZnS. The excess H₂S from the precipitation is returned to the absorber (4) to make more concentrated Ca(SH)₂ solution. The zinc may also be precipitated from the ZnSO₄ solution by means of Na(SH) made from the Ca(SH)₂ from the absorber (4) as indicated in the following chemical equation:

$$ZnSO_4 + 2Na(SH) = ZnS + H_2S + Na_2SO_4$$

A small excess of NaSH or some Ca(SH)₂ should also preferably be present in solution at the end of this precipitation. The Na₂SO₄ is filtered out of the precipitate and is used to make the NaSH solution from the absorbed (4) according to the following equation:

$$Ca(SH)_2 + Na_2SO_4 = CaSO_4 + 2NaSH$$

The excess H₂S from the ZnS precipitation is returned to the absorber (4) to make more Ca(SH)₂ solution. The ZnS precipitate containing a small amount of excess NaSH or a small amount of Ca(SH)₂ added at the end of the precipitation or during the filtering operation is dried, calcined, quenched, and ground washed and dried to make a zinc sulphide pigment. The excess Ca(SH)₂ retained in the ZnS precipitate during the calcination improves the light resistant qualities of the pigment. The zinc sulphate may be treated with a CaCl₂ solution in the precipitator (9) to precipitate CaSO₄ and form a pure zinc chloride solution as indicated below:

$$ZnSO_4 + CaCl_2 = CaSO_4 + ZnCl_2$$

The ZnCl₂ solution being separated out of this solution in the dewaterer (10) and the separated from the residual ZnCl₂ solution by washing in the counter-current washer (37) and filter (8), the wash solutions being mixed with the ZnCl₂ solution from the dewaterer (10). (If it is desired to market the ZnCl₂ solution as such, a relatively concentrated CaCl₂ solution is secured from an external source, but if the ZnCl₂ solution is to be used for preparation of other zinc products as shown on the flow sheet, the CaCl₂ solution is obtained described below.) The hot dilute ZnCl₂ solution thus obtained is heated to boiling and a chemical equivalent of finely divided (ground or precipitated) CaCO₃ to ZnCl₂ in solution, is added and this mixture boiled until the zinc is substantially completely precipitated as a basic zinc carbonate. The precipitation requires from 30 minutes (or less) to an hour depending upon the fineness of the CaCO₃. To secure substantially complete precipitation, the solution should preferably not carry much above 2½% zinc, as the completeness of precipitation decreases with increase in concentration of the ZnCl₂ solution as shown in Fig. I. The precipitated zinc product obtained as above described is not pure basic zinc carbonate but contains some unconsumed CaCO₃ and some Cl which may be removed as described below. The basic zinc carbonate precipitate is separated from the hot relatively dilute CaCl₂ solution in the dewaterer (12) and the CaCl₂ solution is sent to the CaSO₄ precipitator (9) as shown upon the flow sheet. The residual CaCl₂ is separated from the basic zinc carbonate precipitate in the counter-current washer (13) and the washed precipitate is ground with hot water in the treater (consisting of a pebble mill or other suitable grinder) (14) to complete the reaction between the CaCO₃ and ZnCl₂ contained in the precipitate. The treated precipitate is then separated from the solution by filtration in the filter (48). The wash water from the filter (48) and the wash water used in the treater (14) are both used in the counter current washing operation and then mixed with the CaCl₂ solution and passed through the evaporator and heater (60) (preferably of the rotor cylinder spray type previously described) to evaporate the excess water before being returned to the precipitator (9).

The treatment of the basic zinc carbonate precipitate by grinding and washing with hot water may be repeated depending upon the degree of purity desired. If either the CaCO₃ or Cl are in excess during this treatment sufficient CaCO₃ or ZnCl₂ may be added to bring them into equimolecular proportions.

The basic zinc carbonate secured as outlined above may be dried and marketed as such. It may also be used to neutralize the acid in a rapidly circulated electrolytic zinc circuit so as to maintain a highly concentrated and substantially neutral ZnSO₄ solution in the circuit and make electrolytic zinc therefrom with a considerable increase in economy over present electrolytic practice. It may also be calcined in the calciner (49) as indicated in the flow sheet to make zinc oxide. This product may be marketed as such as a zinc oxide pigment or may be used in an electrolytic zinc circuit for the recovery of the zinc in metallic form as described above for the basic zinc carbonate. If the ZnO is marketed as a pigment it should preferably be calcined at a high temperature since this treatment gives a pigment of higher covering power than the oxide formed at lower temperatures, whereas if the oxide is to be dissolved it should preferably be calcined at a lower temperature (300°–400° C.) to secure a more readily soluble product.

The zinc oxide made by calcining the basic carbonate may also be treated upon a Wetheril grate to make sublimed zinc oxide or may be treated in a retort plant to recover the zinc in metallic form. The zinc made from this product by retorting is equal in purity to the best grades of electrolytic zinc.

The basic zinc carbonate and the zinc oxide may both be used to make a high grade pigment zinc sulphide by treating them in emulsion in water with H₂S from the sulphator (1). This operation is preferably carried out by passing the H₂S from the sulphator (1) into a spray formed of the water emulsion of the basic zinc carbonate or oxide in the sulphidizer (50) until the products are completely sulphidized, as indicated below;

$$2ZnCO_3 \cdot 3Zn(OH)_2 + 5H_2S = 5ZnS + 8H_2O + 2CO_2$$

The sulphidizer is preferably of the rotating cylinder spray type, enclosed in a housing as previously described. The ZnS from the sulphidizer is filtered and washed (if necessary) upon the filter (51) and is then dried and calcined in the calciner (52) at a temperature above 500° C. (preferably between 625° and 675° C.) and is then quenched and thereafter finely ground to make the finished zinc sulphide pigment. The product made in this way is a white pigment of high tinting strength and covering power and is very resistant to light.

From the foregoing brief description it will be apparent that the invention makes possible the treatment of raw zinc sulphide ores in such a way as to recover the zinc therefrom in a variety of diversified products of the highest purity by methods which are relatively cheap, and simple in operation.

Having described my process what I claim and desire to patent is:

1. The process of treating zinc sulphide ores and concentrates which consists in grinding said ores and the like with a small excess of hot sulphuric acid of a concentration between about 60% and about 70% and at a temperature near the boiling point of said acid and thereby decomposing the zinc sulphide and forming solid zinc sulphate and driving off the sulphur as $H_2S$, the amount of such acid being sufficient to form with the ore, a readily flowable ore pulp, but insufficient to dissolve any large fraction of the zinc sulphate produced, adding sulphuric acid of materially higher concentration, during the reaction, in amount sufficient to substantially maintain the acid within the range of concentration above stated, and after substantially complete sulphation of the ore, to solid zinc sulphate, filtering excess acid away from the mixing of solid zinc sulphate and ore residue and using said excess acid in the treatment of more ore.

2. The process of treating zinc sulphide ores and concentrates which consists in grinding said ores and the like with an excess of hot sulphuric acid of a concentration between 60% and 70% $H_2SO_4$ at a temperature approaching the boiling point of said acid and thereby decomposing the zinc sulphide and forming solid zinc sulphate and driving off the sulphur as $H_2S$, adding to the mixture during such operation, sulphuric acid of a substantially higher concentration, to hold the acid concentration approximately within the range of concentration above stated during the major part at least of the sulphation process, and the total amount of sulphuric acid used being insufficient to dissolve any large fraction of the zinc sulphate produced by the sulphation, and, after sulphation of the zinc sulphide in the ore has been substantially completely accomplished, filtering excess acid away from the mixture of solid zinc sulphate and residual ore and using said acid in the treatment of more ore.

3. The process of treating zinc sulphide ores and concentrates which consists in grinding said ores and the like with such an excess of hot relatively concentrated sulphuric acid of such concentration as to decompose the zinc sulphide and form solid zinc sulphate and drive off the sulphur as $H_2S$ and thereafter filtering excess acid away from the mixture of solid zinc sulphate and ore residue and mixing said zinc sulphate and ore residue with sufficient water to dissolve said solid zinc sulphate and form an acid zinc sulphate solution and adding oxidized zinc ore to said mixture to neutralize the acid in said solution and sufficient oxidizing agent to precipitate the iron and manganese therefrom, and separating said neutral zinc sulphate solution from the insoluble ore residue, and treating said neutral solution with metallic zinc to precipitate metals below zinc in the electromotive series therefrom, and separating the pure neutral zinc sulphate solution from said precipitated metals and excess of metallic zinc, and mixing said pure zinc sulphate solution with a calcium chloride solution made as described below to precipitate calcium sulphate and a zinc chloride solution, and precipitating the zinc from said zinc chloride with a lime compound to form a calcium chloride solution and separating said calcium chloride solution from said zinc precipitate, and using said calcium chloride solution to treat more zinc sulphate solution as described above.

4. The process of treating zinc sulphide ores and concentrates which consists in grinding said ores and the like with such an excess of hot relatively concentrated sulphuric acid of such concentration as to decompose the zinc sulphide and form solid zinc sulphate and drive off the sulphur as $H_2S$ and thereafter filtering excess acid away from the mixture of solid zinc sulphate and ore residue and mixing said zinc sulphate and ore residue with sufficient water to dissolve said solid zinc sulphate and form an acid zinc sulphate solution and adding oxidized zinc ore to said mixture to neutralize the acid in said solution and sufficient oxidizing agent to precipitate the iron and manganese therefrom, and separating said neutral zinc sulphate solution from the insoluble ore residue, and treating said neutral solution with metallic zinc to precipitate metals below zinc in the electromotive series therefrom, and separating the pure neutral zinc sulphate solution from said precipitated metals and excess of metallic zinc, and mixing said pure zinc sulphate solution with a calcium chloride solution made as described below to precipitate calcium sulphate and form a zinc chloride solution, and precipitating the zinc from said zinc chloride with a lime compound to form a calcium chloride solution and separating said calcium chloride solution from said zinc precipitate, and using said calcium chloride solution to treat more zinc sulphate solution as described above, and treating said zinc precipitate with $H_2S$, from above said treatment of zinc sulphide ore with sulphuric acid, to convert said precipitate to zinc sulphide and washing and calcining and quenching and grinding said zinc sulphide to make zinc sulphide suitable for use as a paint pigment.

5. The process of treating zinc sulphide ores and concentrates which consists in grinding said ores and the like with such an excess of hot relatively concentrated sulphuric acid of such concentration as to decompose the zinc sulphide and form solid zinc sulphate and drive off the sulphur as $H_2S$ and thereafter filtering excess acid away from the mixture of solid zinc sulphate and ore residue and mixing said zinc sulphate and ore residue with sufficient water to dissolve said solid zinc sulphate and form an acid zinc sulphate solution and adding oxidized zinc ore to said mixture to neutralize the acid in said solution and sufficient oxidizing agent to precipitate the iron and manganese therefrom, and separating said neutral zinc sulphate solution from the insoluble ore residue, and treating said neutral solution with metallic zinc to precipitate metals below zinc in the electromotive series therefrom, and separating the pure neutral zinc sulphate solution from said precipitated metals and excess of metallic zinc, and mixing said pure zinc sulphate solution with a calcium chloride solution, made as described below, to precipitate calcium sulphate and form a zinc chloride solution, and boiling said solution with finely divided calcium carbonate to precipitate the zinc as a basic zinc carbonate and form a calcium chloride solution and using said calcium chloride solution to treat more zinc sulphate solution as described above.

6. The process of treating zinc sulphide ores and concentrates which consists in grinding said ores and the like with such an excess of hot relatively concentrated sulphuric acid of such concentration as to decompose the zinc sulphide and form solid zinc sulphate and drive off the sulphur as $H_2S$ and thereafter filtering excess acid away from the mixture of solid zinc sulphate and ore residue and mixing said zinc sulphate and ore residue with sufficient water to dissolve said solid zinc sulphate and form an acid zinc sulphate solution and adding oxidized zinc ore to said mixture to neutralize the acid in said solution and sufficient oxidizing agent to precipitate the iron and manganese therefrom, and separating said neutral zinc sulphate solution from the insoluble ore residue, and treating said neutral solution with metallic zinc to precipitate metals below zinc in the electromotive series therefrom, and separating the pure neutral zinc sulphate solution from said precipitated metals and excess of metallic zinc, and mixing said pure zinc sulphate solution with a calcium chloride solution, made as described below, to precipitate calcium sulphate and form a zinc chloride solution, and boiling said solution with finely divided calcium carbonate to precipitate the zinc as a basic zinc carbonate and form a calcium chloride solution and using said calcium chloride solution to treat more zinc sulphate solution as described above, and treating said basic zinc carbonate with $H_2S$, produced in said treatment of zinc sulphide or with sulphuric acid, to convert said precipitate to zinc sulphide and washing and calcining and quenching and grinding said zinc sulphide to make a zinc sulphide suitable for use as a paint pigment.

7. The process of treating zinc sulphide ores and concentrates which consists in grinding said ores and the like with such an excess of hot relatively concentrated sulphuric acid of such concentration as to decompose the zinc sulphide and solid zinc sulphate and drive off the sulphur as $H_2S$ and thereafter filtering excess acid away from the mixture of solid zinc sulphate and ore residue and mixing said zinc sulphate and ore residue with sufficient water to dissolve said solid zinc sulphate and form an acid zinc sulphate solution and adding oxidized zinc ore to said mixture to neutralize the acid in said solution and sufficient oxidizing agent to precipitate the iron and manganese therefrom, and separating said neutral zinc sulphate solution from the insoluble ore residue, and treating said neutral solution with metallic zinc to precipitate metals below zinc in the electromotive series therefrom, and separating the pure neutral zinc sulphate solution from said precipitated metals and excess of metallic zinc, and mixing said pure zinc sulphate solution with a calcium chloride solution made as described below to precipitate calcium sulphate and a zinc chloride solution, and precipitating the zinc from said zinc chloride solution with a lime compound to form a calcium chloride solution and separating said calcium chloride solution from said zinc precipitate, and using said calcium chloride solution to treat more zinc sulphate solution as described above, and calcining said zinc precipitate to make zinc oxide.

8. The process of treating zinc sulphide ores and concentrates which consists in grinding said ores and the like with such an excess of hot relatively concentrated sulphuric acid of such concentration as to decompose the zinc sulphide and form solid zinc sulphate and drive off the sulphur as $H_2S$ and thereafter filtering excess acid away from the mixture of solid zinc sulphate and ore residue and mixing said zinc sulphate and ore residue with sufficient water to dissolve said solid zinc sulphate and form an acid zinc sulphate solution and adding oxidized zinc ore to said mixture to neutralize the acid in said solution and sufficient oxidizing agent to precipitate the iron and manganese therefrom, and separating said neutral zinc sulphate solution from the insoluble ore residue, and treating said neutral solution with metallic zinc to precipitate metals below zinc in the electromotive series therefrom, and separating the pure neutral zinc sulphate solution from said precipitated metals and excess of metallic zinc, and mixing said pure zinc sulphate solution with a calcium chloride solution made as described below to precipitate calcium sulphate and a zinc chloride solution, and precipitating the zinc from said zinc chloride with a lime compound to form a calcium chloride solution and separating said calcium chloride solution from said zinc precipitate, and using said calcium chloride solution to treat more zinc sulphate solution as described above, and calcining said zinc precipitate to make zinc oxide, and treating said calcined zinciferous material with $H_2S$ made from the treatment of zinc sulphide ore with sulphuric acid as described above in the presence of water to convert said oxide to the sulphide, and calcining, quenching and grinding said sulphide to make zinc sulphide suitable for use as a paint pigment.

9. The process of treating zinc sulphide ores and concentrates which consists in grinding said ores and the like with such an excess of hot relatively concentrated sulphuric acid of such concentration as to decompose the zinc sulphide and form solid zinc sulphate and drive off the sulphur as $H_2S$ and thereafter filtering excess acid away from the mixture of solid zinc sulphate and ore residue and mixing said zinc sulphate and ore residue with sufficient water to dissolve said solid zinc sulphate and form an acid zinc sulphate solution and adding oxidized zinc ore to said mixture to neutralize the acid in said solution and sufficient oxidizing agent to precipitate the iron and manganese therefrom, and separating said neutral zinc sulphate solution from the insoluble ore residue, and treating said neutral solution with metallic zinc to precipitate metals below zinc in the electromotive series therefrom, and separating the pure neutral zinc sulphate solution from said precipitated metals and excess of metallic zinc, and mixing said pure zinc sulphate solution with a calcium chloride solution, made as described below, to precipitate calcium sulphate and form a zinc chloride solution, and boiling said solution with finely divided calcium carbonate to precipitate the zinc as a basic zinc carbonate and form a calcium chloride solution and using said calcium chloride solution to treat more zinc sulphate solution as described above, and calcining said basic zinc carbonate to make zinc oxide.

10. The process of treating zinc sulphide ores and concentrates which consists in grinding said ores and the like with such an excess of hot relatively concentrated sulphuric acid of such concentration as to decompose the zinc sulphide and form solid zinc sulphate and drive off the sulphur as $H_2S$ and thereafter filtering excess acid away from the mixture of solid zinc sulphate and ore residue and mixing said zinc sulphate and ore residue with sufficient water to dissolve said solid zinc sulphate and form an acid zinc sulphate solution and adding oxidized zinc ore to said mixture to neutralize the acid in said solution and sufficient oxidizing agent to precipitate the iron and manganese therefrom, and separating said neutral zinc sulphate solution from the insoluble ore residue, and treating said neutral solution with metallic zinc to precipitate metals below zinc in the electromotive series therefrom, and separating the pure neutral zinc sulphate solution from said precipitated metals and excess of metallic zinc, and mixing said pure zinc sulphate solution with a calcium chloride solution made as described below to precipitate calcium sulphate and a zinc chloride solution, and precipitating the zinc from said zinc chloride solution with a lime compound to form a calcium chloride solution and separting said calcium chloride solution from said zinc precipitate, and using said calcium chloride solution to treat more zinc sulphate solution as described above, and calcining said zinc precipitate to make zinc oxide, and treating said zinc with H$_2$S made from the treatment of zinc sulphide ore with sulphuric acid as described above in the presence of water to convert said oxide to the sulphide, and calcining, quenching and grinding said sulphide to make zinc sulphide suitable for use as a paint pigment, and treating said zinc oxide with H$_2$S made from the treatment of zinc sulphide ore with sulphuric acid as described above, in the presence of water to convert said oxide to the sulphide, and calcining, quenching and grinding said sulphide to make zinc sulphide suitable for use as a paint pigment.

11. The process of treating zinc sulphide ores and concentrates which consists in grinding said ores and the like with such an excess of hot relatively concentrated sulphuric acid of such concentration as to decompose the zinc sulphide and drive off the sulphur as H$_2$S and thereafter filtering excess acid away from mixture of solid zinc sulphate and ore residue and mixing said zinc sulphate and ore residue with sufficient water to dissolve said solid zinc sulphate and an acid zinc sulphate solution and separating said solution from said ore residue and adding oxidized ore to said solution to neutralize the acid therein and sufficient oxidizing agent to precipitate the iron and manganese therefrom, and separating said neutral zinc sulphate solution from the residue of oxidized ore and treating said solution with metallic zinc to precipitate metals below zinc in the electromotive series therefrom and separting the pure neutral zinc sulphate solution from said precipitated metals and excess of metallic zinc, to secure a pure neutral zinc sulphate solution.

12. The process of treating zinc sulphide ores and concentrates which consists in grinding said ores and the like with such an excess of hot relatively concentrated sulphuric acid of such concentration as to decompose the zinc sulphide and drive off the sulphur as H$_2$S and thereafter filtering excess acid away from mixture of solid zinc sulphate and ore residue and mixing said zinc sulphate and ore residue with sufficient water to dissolve said solid zinc sulphate and form an acid zinc sulphate solution and separating said solution from said ore residue and adding oxidized ore to said solution to neutralize the acid therein and sufficient oxidizing agent to precipitate the iron and manganese therefrom, and separating said neutral zinc sulphate solution from the residue of oxidized ore and treating said solution with metallic zinc to precipitate metals below zinc in the electromotive series therefrom and separating the pure neutral zinc sulphate solution from said precipitated metals and excess of metallic zinc, to secure a pure neutral zinc sulphate solution, and mixing last said zinc sulphate solution with a calcium chloride solution made as described below to precipitate calcium sulphate and make a zinc chloride solution, and precipitating the zinc from said zinc chloride solution with a lime compound to form a calcium chloride solution and separating said zinc chloride solution from said zinc precipitate and using said calcium chloride solution to precipitate more zinc sulphate solution as described above.

13. The process of treating zinc sulphide ores and concentrates which consists in grinding said ores and the like with such an excess of hot relatively concentrated sulphuric acid of such concentration as to decompose the zinc sulphide and drive off the sulphur as H$_2$S and thereafter filtering excess acid away from mixture of solid zinc sulphate and ore residue and mixing said zinc sulphate and ore residue with sufficient water to dissolve said solid zinc sulphate and form an acid zinc sulphate solution and separating said solution from said ore residue and adding oxidized ore to said solution to neutralize the acid therein and sufficient oxidizing agent to precipitate the iron and manganese therefrom, and separating said neutral zinc sulphate solution from the residue of oxidized ore and treating said solution with metallic zinc to precipitate metals below zinc in the electromotive series therefrom and separating the pure neutral zinc sulphate solution from said precipitated metals and excess of metallic zinc, to secure a pure neutral zinc sulphate solution, and mixing last said zinc sulphate solution with a calcium chloride solution made as described below to precipitate calcium sulphate and make a zinc chloride solution, and precipitating the zinc from said zinc chloride solution with a lime compound to form a calcium chloride solution and separating said zinc chloride solution from said zinc precipitate and using said calcium chloride solution to precipitate more zinc sulphate solution as described above, and treating said zinc precipitate with H$_2$S, from above said treatment of zinc sulphide ore with sulphuric acid, to convert said precipitate to zinc sulphide and washing and calcining and quenching and grinding said zinc sulphide to make a zinc sulphide suitable for use as a paint pigment.

14. The process of treating zinc sulphide ores and concentrates which consists in grinding said ores and the like with such an excess of hot relatively concentrated sulphuric acid of such concentration as to decompose the zinc sulphide and drive off the sulphur as H$_2$S and thereafter filtering excess acid away from mixture of solid zinc sulphate and ore residue and mixing said zinc sulphate and ore residue with sufficient water to dissolve said solid zinc sulphate and an acid zinc sulphate solution and separating said solution from said ore residue and adding oxidized ore to said solution to neutralize the acid therein and sufficient oxidizing agent to precipitate the iron and manganese therefrom, and separating said neutral zinc sulphate solution from the residue of oxidized ore and treating said solution with metallic zinc to precipitate metals below zinc in the electromotive series therefrom and separating the pure neutral zinc sulphate solution from said precipitated metals and excess of metallic zinc, to secure a pure neutral zinc sulphate solution, and mixing said pure zinc sulphate solution with a calcium chloride solution, made as described below, to precipitate calcium sulphate and make a zinc chloride solution, and boiling said solution with calcium carbonate to precipitate the zinc as a basic zinc carbonate and forming a calcium chloride solution and using said calcium chloride solution to treat more zinc sulphate solution as described above.

15. The process of treating zinc sulphide ores and concentrates which consists in grinding said ores and the like with such an excess of hot relatively concentrated sulphuric acid of such concentration as to decompose the zinc sulphide and drive off the sulphur as $H_2S$ and thereafter filtering excess acid away from mixture of solid zinc sulphate and ore residue and mixing said zinc sulphate and ore residue with sufficient water to dissolve said solid zinc sulphate and an acid zinc sulphate solution and separating said solution from said ore residue and adding oxidized ore to said solution to neutralize the acid therein and sufficient oxidizing agent to precipitate the iron and manganese therefrom, and separating said neutral zinc sulphate solution from the residue of oxidized ore and treating said solution with metallic zinc to precipitate metals below zinc in the electromotive series therefrom and separating the pure neutral zinc sulphate solution from said precipitated metals and excess of metallic zinc, to secure a pure neutral zinc sulphate solution, and mixing said pure zinc sulphate solution with a calcium chloride solution, made as described below, to precipitate calcium sulphate and make a zinc chloride solution, and boiling said solution with calcium carbonate to precipitate the zinc as a basic zinc carbonate and forming a calcium chloride solution and using said calcium chloride solution to treat more zinc sulphate solution as described above, and treating said basic zinc carbonate with $H_2S$, from above said treatment of zinc sulphide ores with sulphuric acid, to convert said precipitate to zinc sulphide and washing and calcining and quenching and grinding said zinc sulphide to make a zinc sulphide suitable for use as a paint pigment.

16. The process of treating zinc sulphide ores and concentrates which consists in grinding said ores and the like with such an excess of hot relatively concentrated sulphuric acid of such concentration as to decompose the zinc sulphide and drive off the sulphur as $H_2S$ and thereafter filtering excess acid away from mixture of solid zinc sulphate and ore residue and mixing said zinc sulphate and ore residue with sufficient water to dissolve said solid zinc sulphate and form an acid zinc sulphate solution and separating said solution from said ore residue and adding oxidized ore to said solution to neutralize the acid therein and sufficient oxidizing agent to precipitate the iron and manganese therefrom, and separating said neutral zinc sulphate solution from the residue of oxidized ore and treating said solution with metallic zinc to precipitate metals below zinc in the electromotive series therefrom and separating the pure neutral zinc sulphate solution from said precipitated metals and excess of metallic zinc, to secure a pure neutral zinc sulphate solution, and mixing last said zinc sulphate solution with a calcium chloride solution made as described below to precipitate calcium sulphate and make a zinc chloride solution, and precipitating the zinc from said zinc chloride solution with a lime compound to form a calcium chloride solution and separating said zinc chloride solution from said zinc precipitate and using said calcium chloride solution to precipitate more zinc sulphate solution as described above, and calcining said zinc precipitate to make zinc oxide.

17. The process of treating zinc sulphide ores and concentrates which consists in grinding said ores and the like with such an excess of hot relatively concentrated sulphuric acid of such concentration as to decompose the zinc sulphide and drive off the sulphur as $H_2S$ and thereafter filtering excess acid away from mixture of solid zinc sulphate and ore residue and mixing said zinc sulphate and ore residue with sufficient water to dissolve said solid zinc sulphate and form an acid zinc sulphate solution and separating said solution from said ore residue and adding oxidized ore to said solution to neutralize the acid therein and sufficient oxidizing agent to precipitate the iron and manganese therefrom, and separating said neutral zinc sulphate solution from the residue of oxidized ore and treating said solution with metallic zinc to precipitate metals below zinc in the electromotive series therefrom and separating the pure neutral zinc sulphate solution from said precipitated metals and excess of metallic zinc, to secure a pure neutral zinc sulphate solution, and mixing last said zinc sulphate solution with a calcium chloride solution made as described below to precipitate calcium sulphate and make a zinc chloride solution, and precipitating the zinc from said zinc chloride solution with a lime compound to form a calcium chloride solution and separating said zinc chloride solution from said zinc precipitate and using said calcium chloride solution to precipitate more zinc sulphate solution as described above, and calcining said zinc precipitate to make zinc oxide, and treating said zinc oxide with $H_2S$ made from the treatment of zinc sulphide ore with sulphuric acid as described above, in the presence of water to convert said oxide to the sulphide, and calcining, quenching and grinding said sulphide to make a zinc sulphide suitable for use as a paint pigment.

18. The process of treating zinc sulphide ores and concentrates which consists in grinding said ores and the like with such an excess of hot relatively concentrated sulphuric acid of such concentration as to decompose the zinc sulphide and drive off the sulphur as $H_2S$ and thereafter filtering excess acid away from mixture of solid zinc sulphate and ore residue and mixing said zinc sulphate and ore residue with sufficient water to dissolve said solid zinc sulphate and an acid zinc sulphate solution and separating said solution from said ore residue and adding oxidized ore to said solution to neutralize the acid therein and sufficient oxidizing agent to precipitate the iron and manganese therefrom, and separating said neutral zinc sulphate solution from the residue of oxidized ore and treating said solution with metallic zinc to precipitate metals below zinc in the electromotive series therefrom and separating the pure neutral zinc sulphate solution from said precipitated metals and excess of metallic zinc, to secure a pure neutral zinc sulphate solution, and mixing said pure zinc sulphate solution with a calcium chloride solution, made as described below, to precipitate calcium sulphate and make a zinc chloride solution, and boiling said solution with calcium carbonate to precipitate the zinc as a basic zinc carbonate and forming a calcium chloride solution and using said calcium chloride solution to treat more zinc sulphate solution as described above, and calcining said basic zinc carbonate to make zinc oxide.

19. The process of treating zinc sulphide ores and concentrates which consists in grinding said ores and the like with such an excess of hot relatively concentrated sulphuric acid of such concentration as to decompose the zinc sulphide and drive off the sulphur as $H_2S$ and thereafter filtering excess acid away from mixture of solid zinc sulphate and ore residue and mixing said zinc sulphate and ore residue with sufficient water to dissolve said solid zinc sulphate and an acid zinc sulphate solution and separating said solution from said ore residue and adding oxidized ore to said solution to neutralize the acid therein and sufficient oxidizing agent to precipitate the iron and manganese therefrom, and separating said neutral zinc sulphate solution from the residue of oxidized ore and treating said solution with metallic zinc to precipitate metals below zinc in the electromotive series therefrom and separating the pure neutral zinc sulphate solution from said precipitated metals and excess of metallic zinc, to secure a pure neutral zinc sulphate solution, and mixing said pure zinc sulphate solution with a calcium chloride solution, made as described below, to precipitate calcium sulphate and make a zinc chloride solution, and boiling said solution with calcium carbonate to precipitate the zinc as a basic zinc carbonate and forming a calcium chloride solution and using said calcium chloride solution to treat more zinc sulphate solution as described above, and calcining said basic zinc carbonate to make zinc oxide, and treating said zinc oxide with $H_2S$, made from the treatment of zinc sulphide ore with sulphuric acid as described above, in the presence of water to convert said oxide to the sulphide, and calcining, quenching and grinding said sulphide to make zinc sulphide suitable for use as a paint pigment.

20. A process of treating zinc sulphide ores and zinc sulphide ore concentrates, which comprises sulphating the said zinc ore material with only such an amount of sulphuric acid as to form zinc sulphate in a solid state containing some free sulphuric acid, while keeping up the concentration of said excess acid, as the reaction proceeds, thereafter dissolving such solid zinc sulphate in the presence of a small excess of sulphuric acid to form an acid solution of zinc sulphate.

21. The process of treating zinc sulphide ores and concentrates and the like, which consists in agitating said finely comminuted ores and the like, with such an excess of hot sulphuric acid of a concentration between about 60% and about 70%, that the zinc sulphide in said ore is converted to solid zinc sulphate and the sulphur in said zinc sulphide is driven off as $H_2S$, and maintaining the acid in said mixture between about 60% and about 70% concentration, during said treatment, by the addition of a more highly concentrated $H_2SO_4$, while the sulphation operation is progressing, removing excess acid from the mixture of solid zinc sulphate and ore residue and using said acid in the treatment of more ore, and after such removal of excess acid, dissolving the $ZnSO_4$ away from the ore residue in an aqueous liquid.

NIELS C. CHRISTENSEN.

CERTIFICATE OF CORRECTION.

Patent No. 1,937,632.  December 5, 1933.

NIELS C. CHRISTENSEN.

It is hereby certified that error appears in the printed specification of the above numbered patent requiring correction as follows: Page 5, line 31, claim 1, for "mixing" read mixture; page 5, line 79, claim 3, before the article "a" insert the word form; page 6, line 45, claim 7, before "solid" insert form; page 6, lines 64 and 97, claims 7 and 8, and page 7, line 18, claim 10, respectively, before "a" insert form; page 7, lines 48 and 141, claims 11 and 14, page 8, lines 22 and 132, claims 15 and 18, and page 9, line 14, claim 19, respectively, before "an" insert form; and that the said Letters Patent should be read with these corrections therein that the same may conform to the record of the case in the Patent Office.

Signed and sealed this 20th day of February, A. D. 1934.

F. M. Hopkins

Acting Commissioner of Patents.

(Seal)